3,000,896
PROCESS FOR THE MANUFACTURE OF SECONDARY DIPHENYL-PIPERIDYL-CARBINOLS
Karl Hoffmann and Jules Heer, Binningen, Switzerland, assignors to Ciba Pharmaceutical Products Inc., Summit, N.J.
No Drawing. Filed Jan. 16, 1957, Ser. No. 634,415
Claims priority, application Switzerland Jan. 19, 1956
2 Claims. (Cl. 260—294.7)

This invention provides a new process for the manufacture of N-secondary diphenyl-piperidyl-(4)-carbinols, especially diphenyl-piperidyl-(4)-carbinol, and also salts of these compounds.

Compounds of the general type mentioned above are known, especially their N-tertiary derivatives, for example, from French specification No. 1,049,588. The pharmacological action of diphenyl-piperidyl-(4)-carbinol has been described, for example, by B. B. Brown and others, in Fed. Proc., vol. 14, page 322 (1955). N-secondary diphenyl-piperidyl-(4)-carbinols cannot be made by methods in themselves known. Thus, for example, it is not possible to convert N-secondary piperidine-4-carboxylic acid esters into the desired carbinols with the aid of phenyl-metal compounds. Similarly it is not possible to reduce the pyridyl-(4)-carbinols corresponding to the above cited piperidyl-(4)-carbinols to these latter compounds. By the action of catalytically activated hydrogen the starting material is regenerated, and reduction with nascent hydrogen, for example, with sodium in amyl alcohol leads to the simultaneous replacement of the tertiary alcohol group by hydrogen.

The unexpected observation has now been made that N-secondary diphenyl-piperidyl-(4)-carbinols are obtained by reacting an N-acyl-piperidine-4-carboxylic acid ester with a phenyl-metal compound, and treating the N-tertiary diphenyl-piperidyl-(4)-carbinol so obtained with an alkaline hydrolyzing agent, and if desired, converting the N-secondary diphenyl-piperidyl-(4)-carbinol so obtained into a salt thereof.

The N-acyl-piperidine-4-carboxylic acid esters used as starting materials are advantageously esters of the appropriate carboxylic acids with lower aliphatic alcohols, such as lower alkanols, for example, methanol or ethanol. The acyl radicals are more especially radicals of aliphatic carboxylic acids such as lower fatty acids, for example, the acetyl, the propionyl or the butyryl radical, or a carbalkoxy radical such as the carbomethoxy or carbethoxy radical, the carbobenzoxy radical, or the radical of an aromatic carboxylic acid, for example, the benzoyl radical.

As phenyl-metal compounds there are advantageously used Grignard compounds, for example, phenyl-magnesium halides, such as phenyl-magnesium bromide, or phenyl-lithium compounds, especially phenyllithium itself. Depending on the particular phenyl-metal compound used different intermediate products are obtained. Thus, for example, phenyl-magnesium halides react predominantly with the ester group, whereas by using phenyl-lithium compounds the N-acyl group may also react. Thus, for example, N-(α-phenyl-α-hydroxyethyl)-piperidyl-(4)-diphenyl-carbinol is obtained by reacting an N-acetyl-piperidine-4-carboxylic acid ester with phenyllithium, and the said carbinol can be converted especially easily into the corresponding N-secondary piperidyl compound by means of mild alkaline agents.

The reaction may be carried out in a manner in itself known in the presence or absence of a catalyst and more especially in the presence of a diluent, at the ordinary or a raised temperature and in one or more stages. The invention also includes any modification of the process in which there is used as starting material a compound obtainable as an intermediate product at any stage of the process, and the remaining step or steps of the process are carried out. The starting materials are known or can be made by methods in themselves known.

It has been found that the conversion of the N-tertiary piperidyl-compounds into the N-secondary piperidyl compounds can be carried out only by means of alkaline hydrolyzing agents. Acid agents, in addition to removing the group bound to the ring nitrogen atom, also remove the tertiary hydroxyl group accompanied by the splitting of water. As alkaline hydrolyzing agents there are used more especially aqueous solutions of inorganic or organic bases, and advantageously solutions of alkali metal hydroxides or alkaline earth metal hydroxides, for example, an aqueous solution of caustic soda or caustic potash, or an aqueous solution of ammonia.

Depending on the procedure used the new compounds are obtained in the form of their bases or salts. From the salts the free amine bases can be obtained by methods in themselves known. From the bases salts can be obtained by reaction with acids suitable for forming therapeutically useful acid addition salts, for example, hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, hydroxyethane sulfonic acid, benzene or toluene sulfonic acids or therapeutically active acids.

The compounds obtained by the process of the invention are useful as medicaments, e.g., as tranquilizers.

The following examples illustrate the invention:

*Example 1*

A solution of 28.8 grams of bromobenzene in 200 cc. of ether is added dropwise to a suspension of 2.4 grams of lithium chippings in 200 cc. of absolute ether. When the dissolution of the lithium is complete, a solution of 8.45 grams of N-acetyl-iso-nipecotinic acid ethyl ester in 100 cc. of benzene is run in at room temperature, while stirring well. When the reaction has ceased, the solution is poured on to a mixture of 100 cc. of glacial acetic acid and 100 grams of ice. 14 grams of a sparingly soluble precipitate separate out. The precipitate is filtered off with suction and dried, and it melts at about 260° C. with decomposition. It is N-(α-phenyl-α-hydroxyethyl)-piperidyl-(4)-diphenyl-carbinol and melts at 280° C. after recrystallization from aqueous pyridine.

14 grams of the latter carbinol are dissolved hot in 200 cc. of water and 20 cc. of a concentrated solution of ammonia are added. After a short time 9 grams of diphenyl-piperidyl-(4)-carbinol separate out in the form of fine crystals. After being recrystallized from acetone, the crystals melt at 151–153° C. With dilute hydrochloric acid there is obtained from this substance its sparingly water-soluble hydrochloride and with glacial acetic acid its water-soluble acetate, which melts at 183–185° C.

*Example 2*

A solution of 10 grams of N-acetyl-iso-nipecotinic acid ethyl ester in 100 cc. of benzene is added dropwise, while cooling, to a Grignard solution of 4.0 grams of magnesium and 30 grams of bromobenzene in 200 cc. of ether. The reaction mixture is then poured on to ice-cold acetic acid. 4.3 grams of N-(α-phenyl-α-hydroxyethyl)-piperidyl-(4)-diphenyl-carbinol separate out. The ether-benzene solution is evaporated and yields 8.9 grams of N-acetyl-piperidyl-(4)-diphenyl-carbinol melting at 197–199° C.

The latter carbinol is heated at 150–160° C. in a solution of 10 grams of potassium hydroxide, 10 cc. of water and 200 cc. of ethylene glycol. After diluting the mixture, 7.2 grams of piperidyl-(4)-diphenyl-carbinol separate out in the form of small needles melting at 151–152° C.

The 4.3 grams of N-(α-phenyl-α-hydroxyethyl)-piperidyl-(4)-diphenyl-carbinol obtained as a by-product are boiled in an aqueous solution of ammonia as described in Example 1, whereby 3.2 grams of piperidyl-(4)-diphenyl-carbinol are obtained.

*Example 3*

A solution of 12 grams of N-benzoyl-iso-nipecotinic acid ethyl ester in 100 cc. of benzene is added dropwise to a Grignard solution of 4.8 grams of magnesium and 33 grams of bromobenzene in 200 cc. of ether. The reaction mixture is then mixed with ice and acetic acid, and the benzenic ethereal layer is separated off in a separating funnel. After washing the latter neutral with water and evaporating it, the residue is heated at 150° C. in a bomb tube in a solution of 10 grams of potassium hydroxide in 100 cc. of water. After about 5 hours the tube is cooled, and the reaction mixture is extracted by agitation with a large quantity of ether. Finally, by evaporating the ethereal solution, a crude product is obtained which melts at 151–153° C. after recrystallization from acetone, and is piperidyl-(4)-diphenyl-carbinol. The yield is 80 percent of the theoretical yield.

*Example 4*

A solution of 12.5 grams of N-carbobenzoxy-iso-nipecotinic acid ethyl ester in 100 cc. of benzene is carefully added to a Grignard solution of 4.2 grams of magnesium and 30 grams of bromobenzene in 250 cc. of ether. When the addition is complete, stirring of the reaction mixture is continued for 30 minutes at 36° C. and the mixture is then poured into ice-cold 2 N-hydrochloric acid. The ether-benzene solution is then separated by means of a separating funnel, dried and evaporated. The residue is recrystallized from isopropyl ether. There are obtained in this manner 12 grams of N-carbobenzoxy-piperidyl-(4)-diphenyl-carbinol of melting point 153–154° C. When 2 grams thereof are heated to 150° C. for 4 hours in a solution of 1 gram of potassium hydroxide, 1 cc. of water and 40 cc. of ethylene glycol, there are obtained after the addition of 100 cc. of water 1.5 grams of a crude product which, on recrystallization from acetone, yields the piperidyl-(4)-diphenyl-carbinol melting at 151–153° C.

What is claimed is:

1. A process for the manufacture of diphenyl-piperidyl-(4)-carbinol, wherein the N-acyl-piperidine-4-carboxylic acid lower alkyl ester, acyl being selected from the group consisting of lower alkanoyl and benzoyl, is condensed with phenyllithium and the resulting diphenyl-(N-substituted-4-piperidyl)-carbinol is hydrolyzed with an inorganic base selected from the group consisting of an alkali metal hydroxide and ammonia.

2. Process according to claim 1, wherein N-acetyl-piperidine 4-carboxylic acid lower alkyl ester is used as the starting material.

References Cited in the file of this patent

UNITED STATES PATENTS 2,663,714     Kornfeld _____ Dec. 22, 1953
2,739,969     Sperber et al. _____ Mar. 27, 1956

OTHER REFERENCES

Kharasch et al.: Grignard Reactions of Nonmetallic Substances (text), pages 871–873 and 876, Prentice-Hall Inc., N.Y., 1954.